June 9, 1942.  F. WUNSCH  2,285,482

METHOD OF AND APPARATUS FOR MEASURING

Filed Feb. 24, 1939  4 Sheets-Sheet 1

INVENTOR.
Felix Wunsch
BY Cornelius D. Ehret
ATTORNEY.

June 9, 1942.  F. WUNSCH  2,285,482
METHOD OF AND APPARATUS FOR MEASURING
Filed Feb. 24, 1939  4 Sheets-Sheet 2

INVENTOR.
Felix Wunsch
BY Cornelius D. Ehret
ATTORNEY.

June 9, 1942.  F. WUNSCH  2,285,482
METHOD OF AND APPARATUS FOR MEASURING
Filed Feb. 24, 1939  4 Sheets-Sheet 3
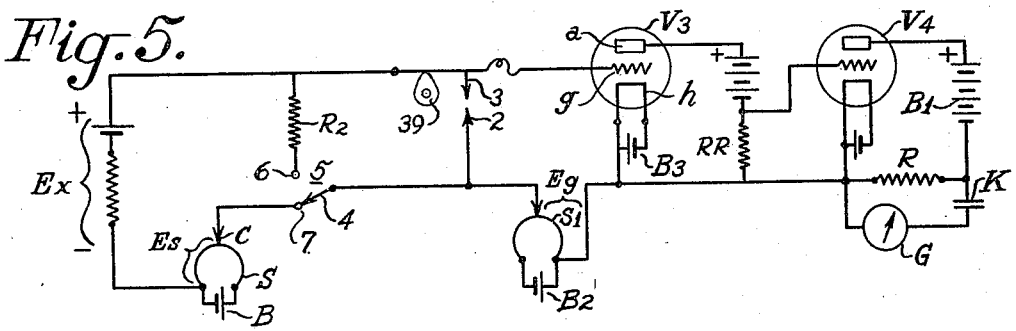
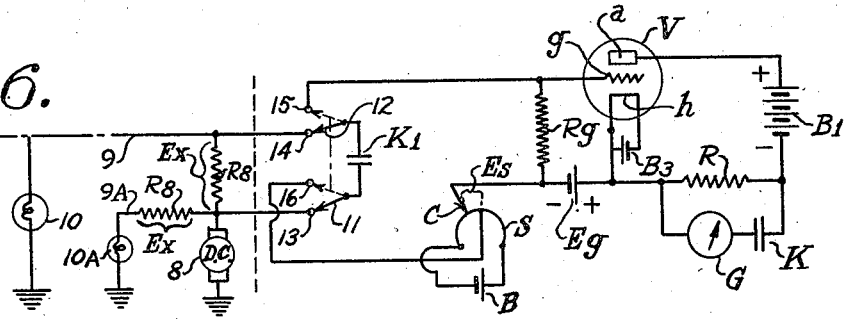
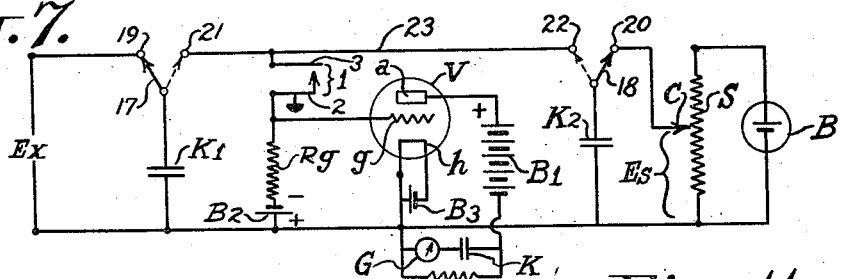
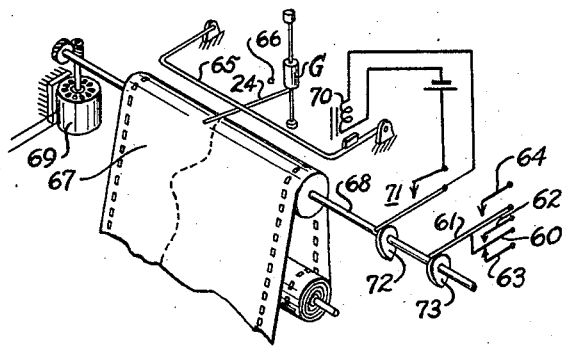
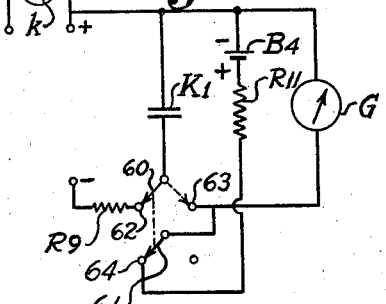
INVENTOR.
Felix Wunsch
BY
Cornelius L. Ehret
ATTORNEY.

June 9, 1942.  F. WUNSCH  2,285,482
METHOD OF AND APPARATUS FOR MEASURING
Filed Feb. 24, 1939  4 Sheets-Sheet 4
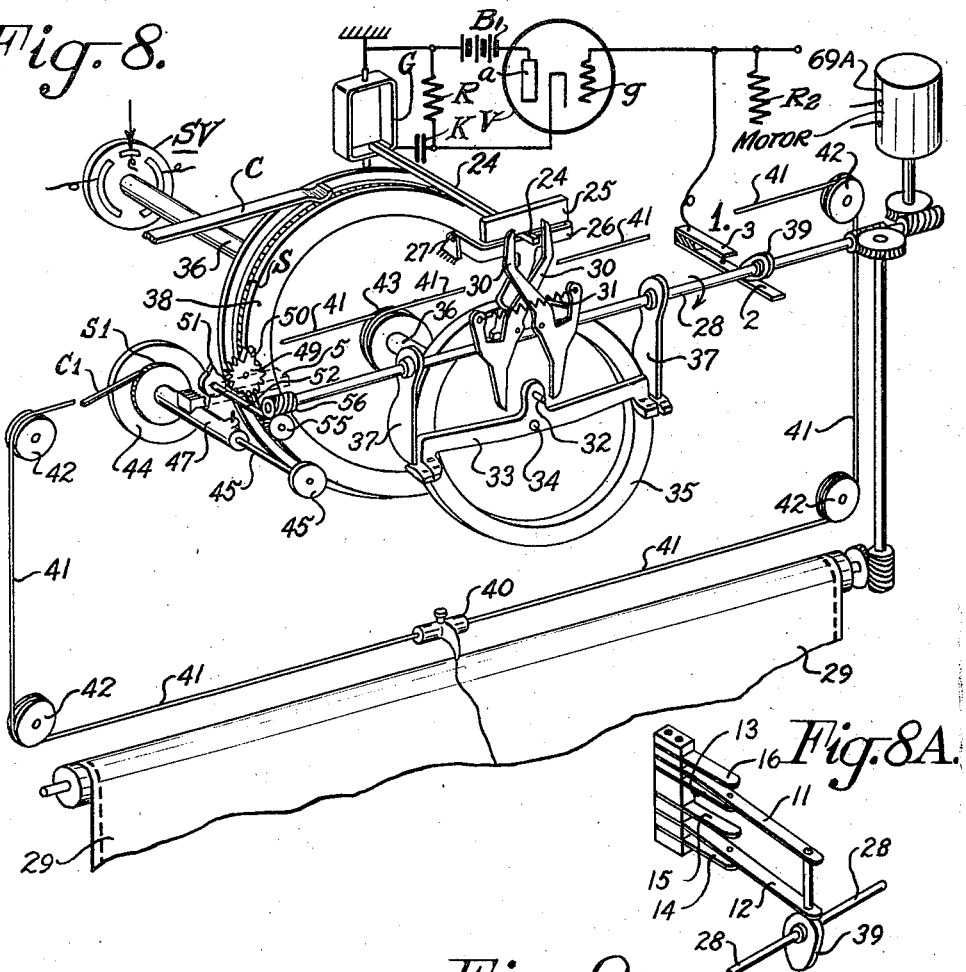
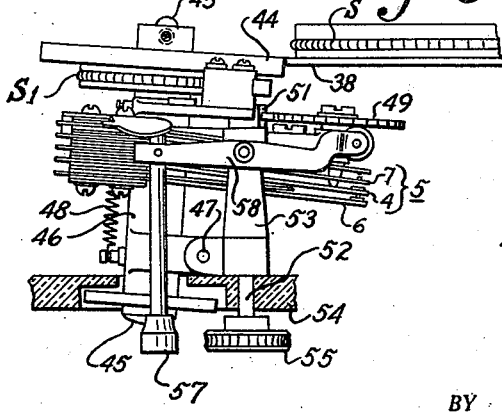
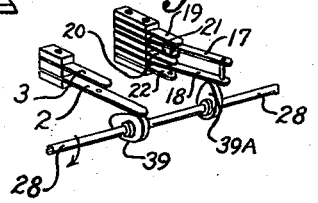
INVENTOR.
Felix Wunsch
BY
Cornelius D. Ehret
ATTORNEY.

Patented June 9, 1942

2,285,482

UNITED STATES PATENT OFFICE 2,285,482

METHOD OF AND APPARATUS FOR MEASURING

Felix Wunsch, Philadelphia, Pa., assignor to Leeds & Northrup Company, Philadelphia, Pa., a corporation of Pennsylvania Application February 24, 1939, Serial No. 258,140

14 Claims. (Cl. 171—95)

My invention relates to methods of and apparatus for measuring, controlling or recording the magnitudes or variations in magnitude of a condition or quantity, and particularly concerns the measurement of potentials or small currents in high resistance circuits.

In accordance with those aspects of my invention concerned with recording, the movable system of a galvanometer, or equivalent, is intermittently or periodically restrained, for recording and/or control purposes, while deflected in response to transient flow of current, occasioned by a change in the electrostatic or electromagnetic energy of a reactance corresponding with the unbalance between a standard electromotive force, either fixed or variable in magnitude depending upon the selected type of measuring circuit, and an electromotive force of unknown magnitude constituting or being a function of the condition or quantity under measurement.

In those forms of my invention utilizing a thermionic tube, and whether or not concerned with recording or controlling, the aforesaid unbalanced electromotive force or other electromotive force to be measured is applied abruptly to change the potential of a control electrode of the tube and so effect increase or decrease of the energy stored in a condenser or inductance in the anode circuit of the tube with utilization of the inertia of the movable system of the galvanometer to insure persistence of its deflection after the charge or discharge of the condenser or inductance has ceased.

Furthermore, in forms of my invention utilizing a thermionic tube, for adjustment of the tube to proper operating condition, the sources of known and unknown potential are, from time to time, or automatically at suitable intervals, replaced by a checking resistance and the biasing potential applied to the control electrode of the tube is adjusted, if necessary, to a magnitude for which there is no change in anode current upon opening or closure of a relatively low resistance circuit in shunt to the aforesaid checking resistance.

My invention further resides in methods and apparatus having the features herein described and claimed.

For an understanding of my invention and for illustration of various forms thereof, reference is to be had to the accompanying drawings in which Fig. 1 is a wiring diagram of a measuring system;

Figs. 1a, 1b and 1c schematically represent various devices producing potentials to be measured;

Fig. 5 is a modification of the system of Fig. 1 utilizing an additional amplifier stage;

Figs. 6 and 7 are diagrams of other measuring systems utilizing the invention;

Fig. 8, in perspective, illustrates recording apparatus for use with any of the measuring systems of Figs. 1 to 7;

Figs. 8A and 8B, in perspective, illustrate modifications of switching devices shown in Fig. 8;

Fig. 9 is a plan view of switching and bias-adjusting mechanism shown in Fig. 8;

Fig. 10, in perspective, schematically illustrates another recorder system utilizing the invention;

Fig. 11 is a wiring diagram of the measuring system used with the recorder of Fig. 10.

Figure 1:
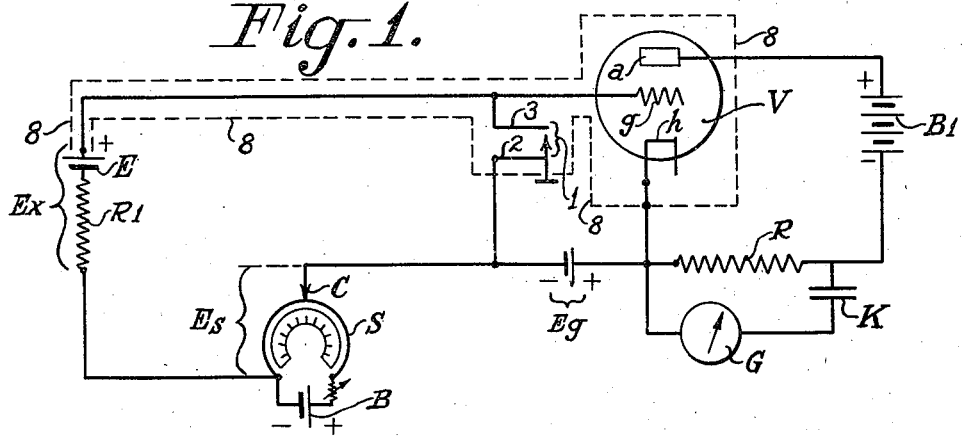

In the measuring system shown in Fig. 1, the source of unknown voltage $Ex$ to be measured is connected in the input circuit of a vacuum tube V in series with a known voltage $Es$ which, in the particular system of Fig. 1, is derived from a potentiometer slidewire S traversed by current of constant known magnitude supplied, for example, by a battery B. The usual arrangement including a standard cell for standardizing the slidewire current is not shown. By adjustment of the slidewire contact C the voltage $Es$ may be made equal to the unknown voltage $Ex$ and because the sources of the two voltages $Ex$, $Es$ are so poled that they are in opposition in their effect upon the potential of the grid or control electrode $g$ of tube V, the difference between or unbalance of the two voltages may be made equal to zero.

For any given potential of the grid $g$ of the tube, the anode current of the tube, supplied by the battery $B1$ or other suitable source of unidirectional current, has a correspondingly steady magnitude; flow of the anode current through the resistance R produces across the terminals of the resistance R a voltage which is impressed upon the condenser K in series with galvanometer G. So long as the anode current remains constant in magnitude, the quantity of electricity stored in, or the electrostatic charge of, the condenser K remains constant and there is no flow of current through the galvanometer.

To ascertain whether or not the voltages $Ex$ and $Es$ are in balance, the switch I, comprising relatively movable contacts 2, 3, is closed, abruptly to change the potential of the grid $g$ of tube V by an amount corresponding to the difference between the voltages $Ex$ and $Es$; if these voltages are not in balance, the change in potential of the grid causes the plate current to change and correspondingly changes the voltage applied to the condenser K. Depending upon whether the voltage drop across resistance R is increased or decreased when switch 1 is opened or closed, a short impulse of displacement current flows to or from the condenser through the galvanometer G. The quantity of electricity, coulombs, which flows through the galvanometer is determined by the incremental change in magnitude of the voltage across resistance R and is independent of the rate at which the condenser receives or loses that quantity; consequently and because the interval during which the displacement current flows upon closure of switch 1 is short compared to the natural period of the moving system of the galvanometer, the extent to which the galvanometer deflects upon opening or closure of the switch does not depend upon the rate of change of the anode current, or the rate of charge or discharge of the condenser. (The period of a galvanometer may be defined as the time in seconds elapsing between two successive passages of the pointer in the same direction through the position of rest.)

When the switch 1 is opened, the grid potential is again abruptly changed by an amount corresponding with the unbalance then existent between the known and unknown voltages; and again, because the change in plate current causes the voltage across resistance R to assume a new value, there is flow of a definite quantity of electricity to or from the condenser causing deflection of galvanometer G. Assuming no change in magnitude of $Ex$ or $Es$ in the interval between closure and opening of the switch 1, the galvanometer deflects in one direction upon closure of the switch and in the opposite direction upon opening of the switch. If the measuring system is used in a recorder or a controller, one or the other of these deflections, as hereinafter explained, is suppressed.

Preferably, the condenser K has a large capacity, for example, of the order of ten to twenty microfarads, because other conditions remaining the same, the greater the capacity of condenser K, the greater the deflection of the galvanometer for a given abrupt change in potential of grid $g$; condenser K should not be of a type, for example the elecetrolytic type, which permits flow through the condenser of leakage current; a high-grade paper condenser is satisfactory. By utilizing a large condenser and opening or closing switch 1 at intervals which are greater than the time constant of the network including condenser K, a small change in the potential of the grid, corresponding with only a small change in the anode current of the tube nevertheless produces for a brief interval a relatively large flow of current through the galvanometer.

The amplifier system comprising switch 1, tube V, resistance R, condenser K and galvanometer G, is not a "voltage-amplifier," a "current-amplifier" or a "power-amplifier," as those terms are ordinarily used; it may quite properly be termed a "ballastic amplifier." The sensitivity of the amplifier system is proportional to the product of the transconductance (mutual conductance) of tube V, the resistance of R, and the capacity of K; variation in any of these factors does not change the accuracy of the system.

The measuring system is of particular value in measuring small potentials which, either because of the nature of the potential source, or the circuit in which it is employed, can be represented, as shown in Fig. 1, by a source of voltage E in series with a high resistance $RI$, having for example, a resistance which may be within the range of from 2 to 100 megohms. It is not feasible directly to measure the potential of such a source with a galvanometer because of the low impedance and the relatively high current requirements of the galvanometer; the potential difference at the galvanometer terminals would be far less than the potential difference of source E because of the voltage drop across resistance $RI$ due to flow of current therethrough. Moreover, in many devices, the internal resistance represented by the equivalent series resistance $RI$ is not constant but varies as a function of the current supplied by the device. In the system described, when the voltages $Ex$ and $Es$ are in balance, $Es$ may be read, and because there is no current drain at that time from the unknown source $Ex$ whether or not the switch 1 is open or closed, the accuracy of the measurements is not affected by the magnitude or variations in magnitude of resistance $RI$.

With the system of Fig. 1 as thus far described, the switch 1 is operated manually, and the contact C of the slidewire S adjusted manually until the voltage $Es$, which may be read from a scale associated with the slidewire contact C, is equal to the unknown voltage as evidenced by lack of deflection of the galvanometer G when the switch 1 is open or closed, or vice versa. When the measuring system of Fig. 1 is also used for recording, controlling, or recording and controlling, the operation of the switch 1, and adjustment of slidewire C are, as hereinafter appears, effected automatically.

Thus far, it has been assumed the biasing voltage $Eg$, determinative of the potential of the grid $g$ when the standard and unknown voltages $Es$ and $Ex$ are in balance, is of such magnitude that there is inappreciable or zero flow of current from the grid $g$ to the cathode or heater $h$ of tube V.

Figure 2:
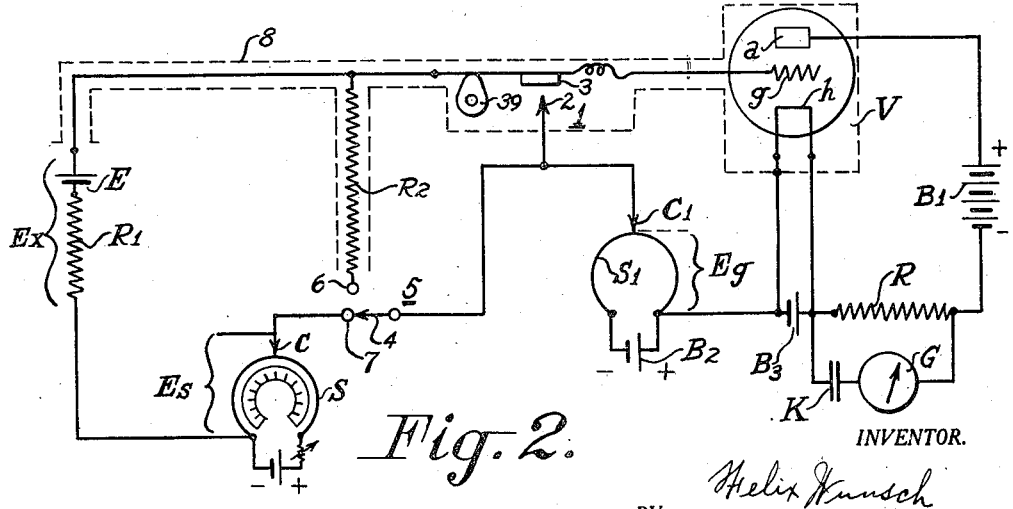
Figs. 2, 3, 4 and 4a are modifications of the system of Fig. 1.

To check the proper magnitude of the operating potential of the grid which, for convenience, is defined to be the potential of the grid when there is zero difference between voltages $Ex$ and $Es$, there is provided, as shown in Fig. 2, a resistance $R2$; the value of this resistance $R2$ is not critical; it may, for example, be any value within the range of, for example, from about 1 to 100 megohms and, in any event, need not bear any definite relation to the resistance $RI$.

Figure 1A:
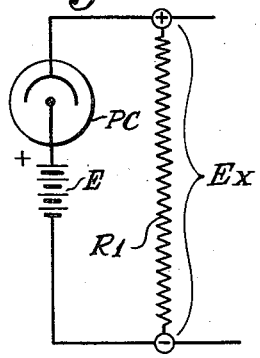
Figure 1B:
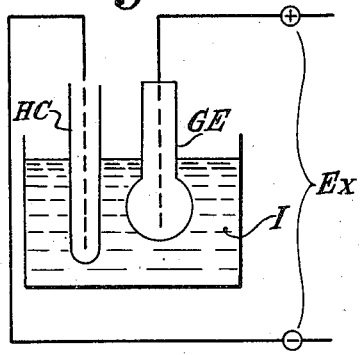
Figure 1C:
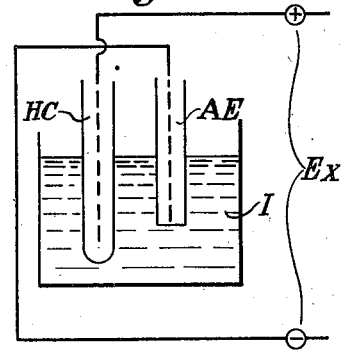

In Fig. 1b, the standard half-cell or calomel electrode HC and the glass electrode GE, such as shown for example in Letters Patent #2,108,293 to Perley, are immersed in the solution I whose ion-concentration is to be measured; the potential developed by a cell of this type is up to about .5 volt, depending upon the ion-concentration, and the internal resistance of the cell, including the electrode and the electrolyte, may be as high as 100 megohms. In Fig. 1c the standard half cell or electrode HC and the antimony electrode AE are immersed in solution I; the potential developed by a cell of this type does not exceed about .7 volt and the internal resistance including electrolyte may vary from, for example, about 1000 ohms to 10 megohms.

With contact 4 of switch 5, Fig. 2, in engagement with contact 6 to include resistance $R2$ in the input circuit of tube V in substitution for the voltage sources $Ex$, $Es$, the grid biasing voltage $Eg$ is adjusted until there is no deflection of the galvanometer G upon opening or closure of switch 1. The biasing voltage $Eg$ may be conveniently derived from a second slidewire potentiometer S1 traversed by current from any suitable source B2. By adjustment of contact C1 of the slidewire, the potential of the grid may be made more or less negative with respect to the cathode $h$ of the tube V; it is not necessary that slidewire S be calibrated or that the current through it be maintained at a standard value; it suffices if the slidewire current be steady and not vary substantially between successive checking operations.

After the biasing voltage $Eg$ has been adjusted to insure negligible flow of grid current, the movable contact 4 of switch 5 is moved out of engagement with contact 6 and into engagement with contact 7, again to include the unknown and standard voltage sources $Ex$ and $Es$ in the input circuit of tube V.

As will hereinafter appear, the switch 5 may be automatically operated at suitable intervals by a recorder or controller mechanism, and the deflections of the galvanometer incident to automatic operation of switch 1 utilized automatically to adjust the biasing voltage $Eg$ to the proper value.

To avoid errors due to rectification by the tube of alternating currents arising because of disposition of the measuring apparatus in a disturbing electric field, due for example, to adjacent 60-cycle power or lighting lines, the conductors and parts, including contact 3 of switch 1 and resistance R2, connected to the grid $g$ and between which and the cathode there is high impedance, should be shielded, generically as indicated by shield 8 connected to the cathode $h$ of the tube or to some point between which and the cathode the circuit impedance is low. When desirable or necessary, the shielding 8 may be extended to surround the source of unknown voltage $Ex$. Though shielding is shown only in Figs. 1 and 2, it is to be understood suitable shielding may, and preferably should be, used in all modifications herein disclosed which utilize thermionic tubes with high impedance input systems.

It is characteristic of the system described, unlike previously known systems using direct-current amplifiers, that the accuracy of the measurements obtained is independent of variations in the tube constants and of variations in the voltages of the batteries or equivalent sources B1, B3 which supply the heater and anode circuits of the tube; the only effect of these variations in my system is somewhat to affect the sensitivity and then only if the variations are of substantial magnitude unlikely to pass unnoticed in actual use of the apparatus.

Figure 3:
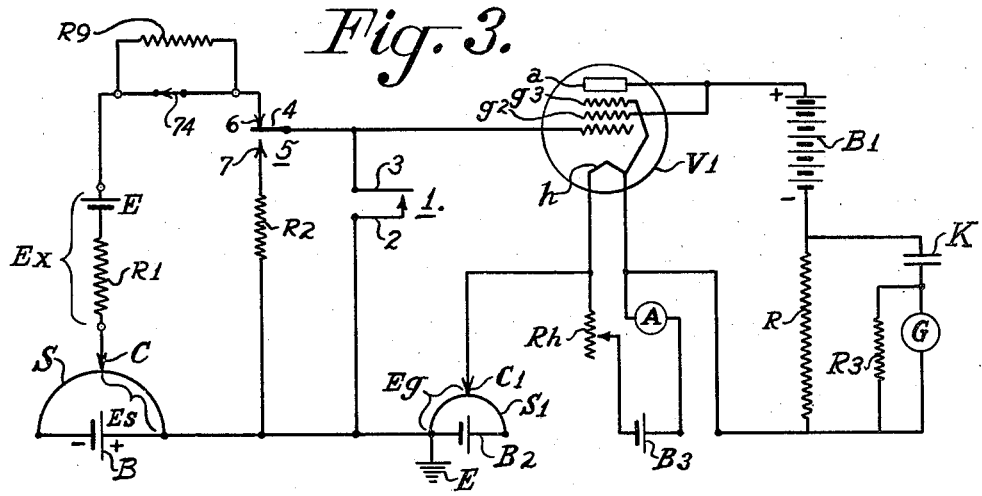

The system shown in Fig. 3 is essentially the same as that shown in Figs. 1 and 2; the tube V1 of Fig. 3 is of the "34" or "1B4" type with the anode $a$ and screen grid $g2$ connected together; the grid $g3$ is connected to the cathode of the tube, whereas the tube V of Figs. 1 and 2 is a triode comprising cathode $h$, grid $g$ and anode $a$. For the types "34" or "1B4" tube the cathode-heating battery B3 may be two dry cells forming a 3-volt battery; the battery B1 for supplying the anode current may be a 45-volt battery; the battery B2 associated with slidewire S1 for supplying the grid bias $Eg$ may be a 1½ or 3-volt battery; and the battery B for supplying the standard voltage $Es$ may, for ion-concentration measurements, be a 1½-volt battery; resistance R may be a 30,000-ohm resistor; condenser K may have a capacity of about 9½ or 10 microfarads. A rheostat $Rh$ may be provided for adjusting the filament or cathode current to proper value as indicated by meter A.

The resistance R3, Fig. 3, is the damping resistance for the galvanometer; it is of such value that the galvanometer is critically damped or, to desired extent, underdamped or overdamped. It is to be understood a suitable damping resistance may be used with the galvanometer G of any of the modifications herein described.

Figure 4:
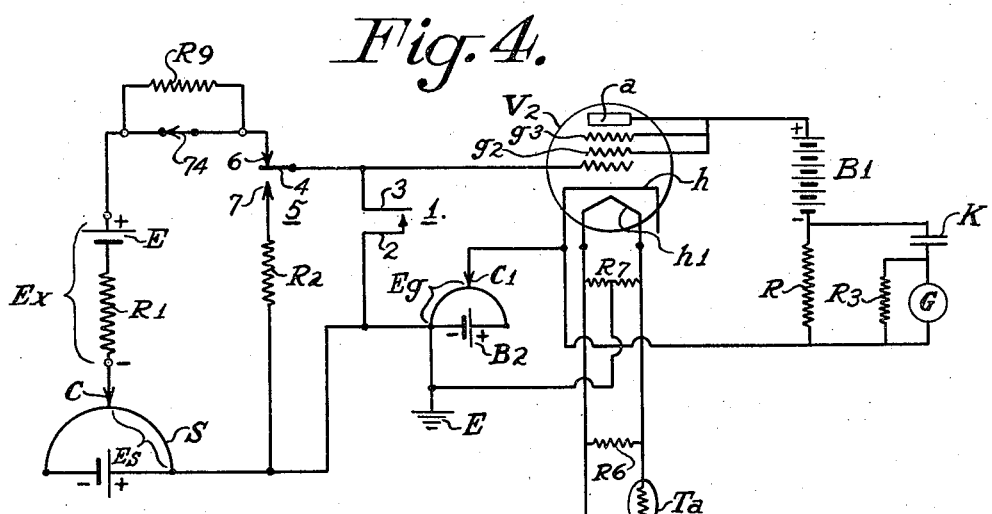

The system shown in Fig. 4 is practically the same as that of Fig. 3 except that alternating current instead of direct current is used to heat the cathode $h$ to electron-emitting temperature and consequently the tube V2, used in this system, is of the indirectly heated cathode type, such as the "77" type suited for either an alternating or direct current as the source of supply for the cathode heating current. The heater $h1$ for raising the cathode $h$ to emission temperature may be supplied from a 110-volt alternating current line, preferably without use of a step-down transformer and by use of a network including ballast tubes and resistors. Specifically, the ballast tubes Ta and Tb are, respectively, of the type "5-A-5" and "9-A-5"; the shunt resistors R5 and R6 are, respectively, 150 and 125 ohms; the series resistor R4 is of 138 ohms resistance; the 50-ohm shunt resistance R7 is center-tapped for connection to the negative terminal of the biasing battery B2 which is preferably connected to earth E. The ordinary and usual fluctuations and voltage of the 110-volt power line have no effect upon the accuracy of the measurements notwithstanding the high sensitivity of the system and the use of a thermionic tube as an amplifier.

The circuit constants and types of tubes mentioned in connection with Figs. 3 and 4 are exemplary and not restrictive of my invention.

Figure 4A:
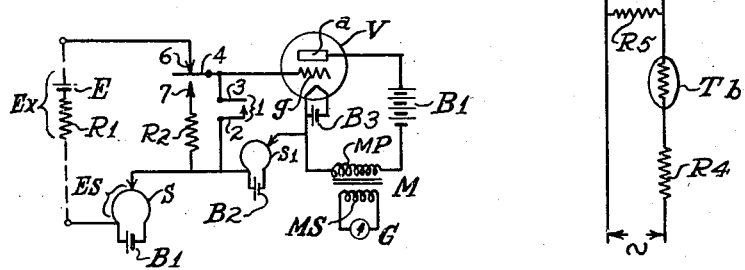

In the ballistic amplifier system of Fig. 4A, the reactor in the anode circuit of the tube V effective, upon abrupt change in magnitude of the potential of the grid $g$ when switch 1 is opened or closed, to produce ballistic deflection of galvanometer G is a mutual inductance (M) instead of a condenser as in the systems of Figs. 1 to 4. If the voltages $Ex$, $Es$ are not equal when switch 1 is opened or closed, there is, for a brief time, a flow of unidirectional current in the circuit including the galvanometer G and coil MS; the direction of flow of the current depends upon the sense of change in magnitude of the anode current of the tube which, in turn, depends primarily upon whether the operation of switch 1 effects increase or decrease of the potential of grid $g$.

In this modification, also, for a given abrupt change in grid potential, a definite quantity of electricity in coulombs flows through the galvanometer to or from a reactance to produce a transient deflection of magnitude substantially proportional to the change in grid potential. The sensitivity of this form of my invention is proportional to the product of the transconductance of the tube times the mutual inductance of the coils MP, MS; for high sensitivity and accuracy the mutual inductance should be large but not so large that the flow of charging or discharge current of the reactance continues for a time which is not short compared with the quarter period of the movable system of the galvanometer; for example, the mutual inductance may be of the order of from about .2 to about .4 henry.

The single-tube systems thus far described afforded ample sensitivity for most measurements, but if additional sensitivity is required, it can be readily obtained by use of one or more additional tubes; the first tube should correspond with any of the tubes V—V2 of Figs. 1 to 4; that is, it should be of a type which has very small grid current, while the additional tube or tubes, for example tube V4, Fig. 5, can be ordinary tubes, such as used in radio sets, whose grid current may not be negligible. In the circuit of Fig. 5, the variations in magnitude of the plate current of tube V3, in whose grid circuit are directly connected the sources of the known and unknown voltages, are utilized to effect the potential of the grid of the subsequent tube V4 in whose plate circuit is included the condenser K and galvanometer G. The tube V4 is, in effect, simply a direct current amplifier interposed between the galvanometer and condenser network of Fig. 1 and the tube V thereof.

In all of the modifications shown in Figs. 1, 2, 3, 4, 4A, 5, 6 and 7, the galvanometer and the reactor for producing its ballistic deflection are in the output system of the tube whose grid circuit includes switch 1; the "output system" of that tube includes its anode circuit and any circuit coupled thereto, conductively, magnetically, electrostatically or by one or more additional tubes.

Use of my systems is not restricted to measurement of potentials produced by ion-concentration cells such as shown in Figs. 1b or 1c; the unknown voltage may, for example, be the voltage drop across a resistance R1, Fig. 1a, in circuit with a photoelectric cell PC and varying as a function of light intensity, turbidity of a liquid, or other condition or quantity.

In the system shown in Fig. 6, a measuring system, essentially the same as that of Fig. 1, is used to measure the voltage difference between points both of which may be at high potential with respect to earth, without need to have the measuring apparatus at potential high with respect to earth.

For example, the unknown voltage $Ex$ may be the voltage drop produced by flow of load current through either of the resistances R8 connected between the ungrounded terminal of the high-voltage direct-current generator 8 and the feeders 9 and 9A to current-consuming devices 10 and 10A; because the load devices are not accessible at the testing location, it is impossible to measure the feeder or load currents in the low-voltage side of the circuit.

When the movable contacts 11 and 12 are in the full line position shown in Fig. 6, in engagement with contacts 13 and 14, the condenser K1 is charged to a voltage equal to that existing across the resistance R8 so that when the movable contacts 11 and 12 are switched to the dotted line position, in engagement with contacts 15, 16, there are in the input circuit of the tube V two sources of voltage in series with one another. The condenser K1 is a source of unknown voltage opposed to the standard voltage $Es$; if these voltages are not equal when the contacts 11, 12 are thrown to their upper position, Fig. 6, the galvanometer C deflects because of transient flow of current to or from condenser K.

In this modification, there may be provided a grid-leak resistance $Rg$ of suitably high magnitude.

As in the other modifications thus far described, the slidewire contact C is adjusted until, when the known and unknown voltages are brought into opposition, there is no deflection of the galvanometer G. Because the polarity of the unknown voltage may not always be known, the slidewire S1 may be tapped intermediate its ends to provide for relative reversal of the known and unknown voltages to bring them into opposition with each other. This same expedient may be used in any of the previously described modifications; the zero of the scale for the slidewire S will, of course, be in a position corresponding with the tap and the scale will indicate increases in both directions from zero.

In Fig. 6 therefore, as in the systems of Figs. 1–5, the known and unknown voltages $Es$ and $Ex$ again are applied in effect in series opposition, with the difference however that in Fig. 6, one of the sources ($Ex$) is itself not applied directly to the input circuit of tube T in opposition to the other source ($Es$); but instead is applied in that circuit by representation by the condenser K1 charged by source $Ex$ and then brought into series opposition to source $Es$; with the effect the resultant voltage jointly impressed by condenser K1 and source $Es$ upon the input circuit of tube T is representative of the unbalance of, or difference between, the voltages of sources $Ex$ and $Es$.

When the movable contacts 17 and 18 of the modification shown in Fig. 7 are in their full line position, the charge received by condenser K1 is proportional to the product of its capacity and the unknown voltage $Ex$; and the charge received by the condenser K2 is proportional to the product of its capacity and the standard voltage $Es$. When the contacts 17 and 18 are moved to the dotted line position to engage contacts 21, 22, connected by conductor 23, the displacement current flows from that condenser which is the more highly charged until the potential difference is the same across both condensers. Thus in effect the unknown voltage $Ex$ is connected in series opposition to the standard voltage $Es$ although, as hereinafter appears, aforesaid potential difference is not equal to the difference between potentials $Ex$ and $Es$ unless the capacity of K1 is equal to the capacity of K2. Shortly after the contacts 17, 18 have been moved to the dotted line position, the switch 1 is closed to connect the conductor 23 to the grid of the tube V. If the charges of the condensers were not equal and therefore completely neutralized upon movement of contacts 17, 18 to the dotted line position, Fig. 7, the unbalanced remnant charge produces aforesaid potential difference between the plates of the condensers; subsequent closure of switch 1, therefore, affects the potential of the grid $g$ of the tube V and so, by the consequent flow of displacement current to or from the condenser K, causes a deflection of the galvanometer G. If the galvanometer deflects, the slidewire contact C is adjusted to a new position and the switches 17, 18, and 1 are again manipulated in sequence until, upon a closure of switch 1, there is no deflection of the galvanometer.

By suitable selection of the ratio of the capacitances of condensers K1, K2, a standard voltage may, in effect, be balanced against a substantially larger or a substantially smaller voltage; at balance $$Ex = Es\frac{K2}{K1}$$

For convenience, Es is made variable and the ratio $$\frac{K2}{K1}$$

maintained fixed at least for a substantial range of measurement.

In Fig. 7 therefore, as in the systems of Figs. 1 to 5, the sources of known and unknown voltages Es and Ex are in effect in series opposition with the difference however that neither of the sources Es, Ex is itself connected to the other source or in the input circuit of tube T or equivalent; instead, the source of unknown voltage Ex, as in Fig. 6, is represented in the input circuit of tube T by the condenser K1 charged from source Ex; but the source of known voltage Es also, and so differing from all the preceding modifications, is, in the input circuit of tube T, represented by the condenser K2 charged from source Es. The connections of the charged condensers to each other in the input circuit are such that, as previously stated, if the charges of the condensers K1, K2 are not equal the unbalanced charge remaining after they have been connected in series with each other produces in the input circuit a potential difference definitely representative of the unbalance of the voltages Ex and Es. When the charges of condensers K1 and K2 are equal, they completely neutralize one another, as previously herein stated, and the aforesaid resultant potential difference is nil. By such arrangement of condensers and connections, the sources of unknown and known voltages Ex and Es are by representation by the condenser charges produced by them applied in input circuit of tube V for detection of unbalance between, or of difference in magnitude of, the voltages Ex and Es.

The mechanism shown in Fig. 8, suited automatically to effect operation of the switch 1 and contact S of Figs. 1, 2, 3, 4, 4A, 5, 6 and 7, the switch 5 of Figs. 2, 3, 4, 4A, 5, the switch contacts 11, 12 of Fig. 6 and switch contacts 17, 18 of Fig. 7 and adjustment of slidewire S1 of Figs. 2, 3, 4, 4A and 5, is similar to that disclosed in Squibb Patent #1,935,732, to which reference is made for a more complete disclosure of the constructional details. The galvanometer G, corresponding with galvanometer G of any of the preceding systems, is provided with a pointer 24 which is intermittently clamped against the stop bar 25 by the rocker arm 26 pivotally mounted at 27 and actuated by a cam, not shown, on shaft 28 which is rotated continuously at constant speed as by an electric motor 69A also utilized to drive the recorder sheet 29.

While the pointer 24 is held by the clamping bars 25, 26, the two feelers 30 are released from the position shown in Fig. 8, to which they were moved by a cam on shaft 28; the spring 31 connected between the feelers moves them toward each other and toward engagement with the projecting end of the clamped pointer 24. If the pointer is held deflected to the right or left of its neutral or central position, one or the other of the feelers passes beyond the neutral position of the pointer, with the result the lower end of that feeler engages a pin 32 extending from the clutch arm 33 and rocks the arm 33 about its pivot 34 to an extent substantially proportional to the displacement of the pointer 24 from its neutral position. Thereafter, in a revolution of shaft 28, the arm 33 in its angularly displaced position is released from a cam (not shown) on shaft 28 for movement into engagement with the driven clutch disk 35 attached to a control shaft 36; while the clutch members 33, 35 are in engagement, one or the other of the cams 37 on shaft 28 engages the clutch member 33 and returns it to its neutral position shown in Fig. 8, and so effects angular displacement of shaft 36 and all parts secured thereto through an angle corresponding with the deflection of the galvanometer pointer.

The arm 33 is thereafter in a revolution of shaft 28 moved away from clutch 35 in readiness for its deflection in the next revolution of shaft 28, if the pointer is again clamped in a deflected position.

Upon the disk 38, secured to the control shaft 36, is mounted the slidewire S; the deflections of the galvanometer pointer to the right or left of its neutral position is effective through the mechanical relay mechanism described to effect adjustment of the slidewire S in one direction or the other in that sense tending to effect balance of the standard voltage Es with the unknown voltage Ex.

The cam 39 on shaft 28 mechanically engages the contact member 2 of switch 1 periodically to move it into and out of engagement with contact 3 for the purposes previously explained. The interval between the successive operations of switch 1 is suitably short, for example, about every two seconds, which affords ample time for charge or discharge of the large condenser K of Figs. 1, 2, 3, 4, 5, 6 and 7, or of the large mutual inductance M, Fig. 4a.

Preferably, the angular relation of cam 39 to the cam (not shown) which controls clamping of the galvanometer pointer and the shape of cam 39 are such that the contacts 2, 3 of switch 1 are separated suitably before the pointer is clamped and that the interval between separation of the contacts and clamping of the pointer substantially corresponds with the time of a one-quarter period of the galvanometer system; it is thus provided that the pointer 24 is clamped at or about the maximum of its ballistic swing. The speed of shaft 28, the period of the galvanometer, and the time constant of the reactor circuit are interrelated; these factors are so chosen or severally and jointly varied that the time of transient flow of the charging or discharge current of the reactor is short compared with the quarter period of the galvanometer and with the time of one revolution of shaft 28, and that the time of one revolution of shaft 28 is suitably greater than at least one-half of the period of the galvanometer.

The shape of the cam 39 is such that when the contacts 2, 3 are re-engaged, the pointer is still clamped, thus preventing a reverse deflection of the galvanometer which would be undesirable in a system in which the galvanometer deflections are utilized to control the position of a recorder marker or the position of some other controlled element such as a pointer or valve element attached to or driven from the shaft 36. If the wrong deflection is suppressed, the automatic adjustment of slidewire S will increase instead of decrease the unbalance between Ex and Es; a simple way of correcting this difficulty, once and for all in a particular installation, is to reverse the galvanometer connections.

In the arrangement shown, the movements of the recorder pen 40 are effected by a flexible cord, violin string, or equivalent 41, which passes over the idler pulleys 42 and around the pulley 43 on the control shaft 36; if it is desired to utilize the deflections of the galvanometer to effect control of a switch, valve, or other member, there may be attached to control shaft 36 a suitable switch element, valve actuator or the like, generally as shown in Smith et al. Patent #1,684,645 and Keeler Patent #1,530,833 generically exemplified by switch SV, Fig. 8.

For actuation of the switch contacts 11, 12 of Fig. 6, cam 39 is utilized to actuate a double-pole, double-throw switch instead of the single-pole, single-throw switch 1 (Fig. 8A); for actuation of switch 1 and of switch contacts 17, 18 of Fig. 7, cams 39 and 39a are utilized (Fig. 8B).

Automatically to effect adjustment of the grid-biasing potential $Eg$ (Figs. 2, 3, 4, 4A, 5 and 6) to insure negligible flow of grid current, there is provided an arrangement which, at suitable intervals, for example every half hour, utilizes the mechanical relay mechanism described to effect adjustment of the slidewire S1. The mechanical construction of the mechanism, Fig. 9, which switches the input circuit of the tube from the voltage sources $Es$, $Ex$, to the checking resistance R2, and concurrently mechanically couples the slidewire S1 to control shaft 36 for adjustment in response to deflections of the galvanometer, is similar to that shown in Figs. 13 and 14 of the aforesaid Squibb patent.

Referring to Figs. 8 and 9 hereof, the slidewire S1 is mounted upon disc 44 secured to shaft 45 rotatable in member 46 pivoted at 47 to a stationary part of the recorder frame or housing. The spring 48 biases the member 46 to the position shown in Fig. 8 with the periphery of the disc 44 out of engagement with the periphery of the slidewire disc 38 on the control shaft 36. From the member 46 extends a support upon which is mounted the gear 49 having at least one high tooth 50; the one-tooth gear 51 for rotating gear 50 is mounted upon shaft 52 which extends through the support 53 and housing member 54. In front of the housing member 54 gear 55 on shaft 52 engages worm 56 on shaft 28.

During rotation of shaft 28, the one-tooth gear 51 at suitable intervals engages the high tooth 50 of gear 49 and by such engagement rocks the pivoted slidewire supporting member 46 to the position shown in Fig. 9, effecting engagement between the disc 44 of slidewire S1 and the disc 38 attached to the control shaft 36; concurrently, the movable contact 4 of switch 5 is moved out of engagement with contact 7 and into engagement with contact 6, thus, as previously described, to disconnect the input circuit of the tube from the standard and unknown voltages and to connect it to the checking resistance R2 in the systems of Figs. 2, 3, 4, 4A, and 5. Engagement between the discs 44 and 38 is maintained for at least several revolutions of shaft 28 to insure sufficient time or sufficient number of checking operations to insure adjustment of the slidewire S1 to such extent that the grid current of tube V is negligible.

As tooth 51 passes out of engagement with the high tooth 50, the biasing spring 48 restores engagement of contacts 4 and 7 and concurrently effects separation of the discs 44 and 38, thus restoring the system to its measuring condition.

At any time the adjustment of the slidewire S1 can be effected semi-automatically by pressing upon the button 57 extending from the pivoted arm 58 through the front panel of the apparatus; by holding the button depressed, the parts are maintained in the position of Fig. 9, thus to effect adjustment of the slidewire S1 by the mechanical relay mechanism in accordance with the galvanometer deflections. When the operator observes the galvanometer no longer deflects, the button 57 is released, whereupon the biasing spring 48 returns the slidewire S1 and the switch 5 to the position shown in Fig. 8.

In the modification of my invention shown in Figs. 10 and 11, the galvanometer G is of the fluxmeter type having such weak suspensions there is practically no restoring force exerted by them.

When the contacts 60, 61 are in the full line position shown in Fig. 11, in engagement respectively with contacts 62 and 64, the source of unknown voltage connected between terminals $+$, $-$, is effective to charge the condenser K1 and the source of current B4 is connected to the galvanometer G to hold its pointer 24 against stop 66; when the contacts 60, 61 are moved to their dotted line position, contact 60 engages contact 63 to discharge the condenser through the galvanometer G now disconnected from battery B4. The transient impulse of displacement current causes the galvanometer pointer 24 to deflect to an extent proportional to the condenser charge and, therefore, to the magnitude of voltage $Ex$; and while the pointer is so deflected, the bar 65 descends to move it into engagement with the recorder sheet 67 to produce a mark thereon. The intermittent raising and lowering of the clamping bar 65 may be effected mechanically from the shaft 68 of the recorder which is constantly driven as by motor 69, or as shown, it may be electromechanically actuated by a solenoid or magnet 70 whose control switch 71 is operated by a cam 72 on shaft 68. The operation of the movable contacts 60, 61 of Fig. 11 may, as shown in Fig. 10, be controlled by a cam 73 on the recorder shaft 68. The angular relation of the cams 72 and 73 is such that the pointer 66 is free to deflect when the contact 60 is moved into engagement with contact 63 and such that the bar 65 is pressed into engagement with the recorder sheet before contact 61 is moved into engagement with contact 64 to reconnect the galvanometer G to battery B4 through resistance R11 of suitably high magnitude to protect the galvanometer from excessive energization.

By utilizing a condenser K1 of suitably large magnitude, the system of Fig. 11 may be made to have sufficiently high sensitivity, without need of a thermionic amplifier, to measure small potentials or small currents and circuits having high resistance; of course, an amplifier may be used in which event, as in the other systems described, the galvanometer is associated with a reactance in the output system of the tube for traverse by a transient current upon change in electrostatic or electromagnetic energy of the reactance. To minimize the effect of connecting the measuring apparatus to the unknown source, and without effect upon the accuracy of the measurements, the high resistance R9 is connected between one of the terminals of condenser K1 and one of the input terminals of the measuring apparatus. By making this resistance of high magnitude, the charging current for the condenser K1, drawn from the source of unknown voltage, is suitably small, but because sufficient time is afforded between successive operations of the switch 60, as determined by suitably slow speed of rotation of shaft 68, the potential difference between the plates of the condenser K1 assumes the same final magnitude and so produces the same effect when the contacts 60 and 61 are thrown to the dotted line position of Fig. 11. Otherwise stated, the interval between successive operations of contacts 60 and 61 to the condenser charging position, full line position of Fig. 11, is greater than the time constant of the circuit comprising condenser K1 and resistance R9.

Similarly, in the systems of Figs. 1, 2, 3, 4, 4a and 5, to suit them to measurement of the potential of a source, for example an ion-concentration cell using an antimony electrode, Fig. 1c, having low resistance but from which it is not desirable to draw appreciable current, there may be inserted in series with Ex, as by opening of switch 74, shown in Figs. 3 and 4, a series resistance R9 of suitably high resistance, for example, 20 megohms.

For measurement of alternating current voltages, a rectifier is connected between the source of unknown voltage and the input terminals of the measuring system with proper poling of the rectifier to insure opposition of the voltages of the condenser and the battery B4. As shown in Fig. 11, the rectifier may be a diode D having its cathode $k$ connected to the + input terminal of the measuring circuit and with its anode $a$ connected to the input terminal AC. In fact, any of the other systems herein previously described may be adapted for measurement of alternating current potentials by use of any suitable rectifier.

The terms "series opposition" and equivalents, in the appended claims, shall be understood with respect to the application of the known and unknown voltages, Es and Ex, as including and comprehending the case where those sources are themselves brought into series opposition; the case where either one of said sources is brought into series opposition with a condenser charged by the other of said sources; and the case where both said sources are applied effectively in series opposition by representation by condensers charged respectively from said sources and brought into series opposition, so yielding a resultant voltage representative of said sources when applied in series opposition. In brief, in all modifications, the voltage applied to the input terminals of the measuring, indicating or equivalent device is equal to, or definitely representative of, the unbalance between, difference in magnitudes of, the voltages Es and Ex.

What I claim is:

1. In a measuring system comprising a galvanometer and a thermionic tube, the method of measuring an unknown voltage which comprises intermittently changing the potential of a control electrode of said tube in accordance with unbalance between said unknown voltage and a known voltage effectively in series opposition the.eto and at intervals each greater than a half period of the galvanometer, producing by each resultant change in anode current of the tube a transient flow of a quantity of electrical energy through the galvanometer, effecting ballistic deflections of the galvanometer by the alternate transient flows of electrical energy through it, and varying said known voltage in sense corresponding with said deflections to effect balance of said voltages.

2. A ballistic amplifier comprising a thermionic tube having a control electrode, means for abruptly changing the potential of said control electrode, a reactance in the output system of said tube, a galvanometer connected for subjection to the charging and discharge currents of said reactance, and means operating in timed relation to said potential-changing means to clamp the movable element of said galvanometer in positions to which deflected by one of said currents and to hold it against deflection by the other of said currents.

3. A system for determining an unknown voltage effectively in series with a high resistance comprising a thermionic tube having a control electrode, a source of known voltage connected in the control electrode circuit of said tube in series with said high resistance and in series opposition with said unknown voltage, switching means for abruptly changing the potential of said control electrode in accordance with the unbalance of said serially opposed voltages, means in the output system of said tube for responding to the potential changes, and means for avoiding errors of measurement due to control electrode current comprising a checking resistance, means for including said checking resistance in said circuit in substitution for said voltages and said high resistance, and means for adjusting the potential of said control electrode during inclusion of said checking resistance in said control electrode circuit for null response of said responsive means upon actuation of said switching means.

4. A system for determining an unknown voltage effectively in series with a high resistance comprising a thermionic tube having a control electrode, a source of biasing voltage, a source of known voltage for connection in series opposition to said unknown voltage, a checking resistance, switching means which for one position includes all of said voltages and said high resistance in series with each other in the control electrode circuit of said tube and which for a second position includes said checking resistance and said source of biasing voltage in series with each other in said circuit, switching means operable for either position of said first-named switching means directly to connect said control electrode to said source of biasing voltage, means in the output system of said tube responsive to effects produced by changes in potential of said control electrode, and means for varying the biasing voltage while said first-named switching means is in its second switching position to obtain null response of said responsive means upon actuation of said second-named switching means.

5. In a system comprising a thermionic tube having a control electrode, means for changing the potential of said electrode by the unbalance between known and unknown voltages, and means in the output circuit of said tube responsive to the effects of the potential changes, a checking resistance, means for avoiding errors due to control electrode current comprising means for replacing said voltages by said checking resistance, and means for adjusting the potential of said control electrode for null response of said responsive means upon short-circuiting of said checking resistance.

6. A measuring system comprising a thermionic tube having a control grid, a source of adjustable biasing voltage, a switch closable directly to connect said source to said grid, sources of known and unknown voltage connected in series opposition, a checking resistance, means for selectively connecting said resistance or said serially connected sources of voltage in shunt to said switch and effectively in series with said source of biasing voltage, and means in the output system of said tube responsive to effects produced by changes of the grid potential occurring upon actuation of said switch.

7. A system comprising a galvanometer having a deflectable element, a thermionic tube having a control electrode, a reactance in the output system of said tube and whose charging and discharging currents, incident to abrupt changes in potential of said control electrode, traverse the galvanometer, a source of known voltage, source of unknown voltage to be measured, means for connecting said sources in series opposition in circuit with said control electrode, means for clamping said element, means operable to release said clamping means and substantially concurrently to change the potential of said control electrode in accordance with the difference between the magnitudes of said voltages, and mechanism responsive to the position of said element while held deflected by said clamping means for effecting equality of said voltages.

8. A system for determining an unknown voltage comprising a thermionic tube having input electrodes, a source of biasing voltage, a source of known voltage opposed to the unknown voltage, switching means movable to one position to connect said source of biasing voltage between said electrodes and to another position to connect all of said voltages in series with each other between said electrodes, a galvanometer in the output system of said tube having a deflectable element, a reactance in the output circuit of said tube charged or discharged through said galvanometer upon actuation of said switch, and means for clamping said element prior to actuation of said switching means to one of said positions and for releasing said element prior to actuation of said switching means to the other of said positions.

9. A measuring system for determining an unknown voltage comprising a source of known voltage connected in series opposition with said unknown voltage, a thermionic tube having a control electrode, a reactance in the output system of said tube, a galvanometer having a deflectable element and traversed by transient current upon charge or discharge of said reactance, means for clamping said element intermittently, a source of biasing voltage, a switch intermittently closed in timed relation to said clamping means to connect said source directly to said electrode, a checking resistance, a selector switch movable to checking and measuring positions for connecting said checking resistance or said serially connected opposed sources of voltage in shunt with said first-named switch and in series with said source of biasing voltage, and mechanism responsive to the clamped positions of said element effective for the checking position of said selector switch to adjust said biasing voltage and effective for the measuring position of said switch to adjust said known voltage for balance against said unknown voltage.

10. A measuring system for determining an unknown voltage comprising a source of known voltage connected in series opposition with said unknown voltage, a thermionic tube having a control electrode, a reactance in the output system of said tube, a galvanometer having a deflectable element and traversed by transient current upon charge or discharge of said reactance, means for clamping said element intermittently, a source of biasing voltage, a switch intermittently closed in timed relation to said clamping means to connect said source directly to said electrode, a checking resistance, a selector switch movable to checking and measuring positions for connecting said checking resistance or said serially connected opposed sources of voltage in shunt with said first-named switch and in series with said source of biasing voltage, mechanism responsive to the clamped positions of said element effective for the checking position of said selector switch to adjust said biasing voltage and effective for the measuring position of said switch to adjust said known voltage for balance against said unknown voltage, and means for operating said selector switch to checking position at intervals long compared with the intervals between successive actuations of said first-named switch.

11. In a measuring system comprising a galvanometer and a thermionic tube, the method of measuring an electromotive force of unknown magnitude which comprises intermittently changing the potential of the control electrode of said tube in opposite senses by amounts each corresponding in magnitude with the difference in magnitudes of said electromotive force and an electromotive force of known magnitude in series opposition thereto and at intervals each longer than a half period of the galvanometer, producing by each resultant change in anode current of the tube transient flow through the galvanometer of a quantity of electrical energy, producing, by at least the alternate flows of electrical energy through it, ballistic deflections of the galvanometer in sense dependent upon the sense of the difference in magnitude of said electromotive forces, and varying the magnitude of said known electromotive force in sense corresponding with said ballistic deflections to effect equality with said unknown electromotive force.

12. A measuring system comprising a ballistic amplifier including a thermionic tube having a control electrode, a source of electromotive force of known magnitude, means for connecting said source in series opposition to a source of electromotive force of unknown magnitude to be measured, means for intermittently abruptly changing the potential of said control electrode in opposite senses in accordance with the difference between the magnitudes of said electromotive forces, a condenser in the output system of said tube, a galvanometer traversed by the charging and discharge currents of said condenser resulting from operation of said potential-changing means, and means operating in timed relation to said potential-changing means intermittently to clamp the movable element of said galvanometer in positions to which deflected by at least one of said currents.

13. A measuring system comprising a ballistic amplifier including a thermionic tube having a control electrode, a source of electromotive force of known magnitude, means for connecting said source in series opposition to a source of electromotive force of unknown magnitude to be measured, means for intermittently abruptly changing the potential of said control electrode in opposite senses in accordance with the difference between the magnitudes of said electromotive forces, a mutual inductance in the output system of said tube, a galvanometer connected for its traverse by the charging and discharge currents of said inductance, and means operating in timed relation to said potential-changing means to clamp the movable element of said galvanometer in positions to which deflected by at least one of said currents.

14. A system comprising a galvanometer having a deflectable element, a reactance, connections providing for traverse of said galvanometer by charging and discharging currents, of magnitude determined by the difference between known and unknown voltages connected in series opposition, of said reactance, structure for intermittently clamping said deflectable element of the galvanometer, and switching means operating in such timed relation to said clamping structure that said element is intermittently clamped in positions to which deflected by at least one of said successive charging and discharging currents.

FELIX WUNSCH.